United States Patent
Guo et al.

(10) Patent No.: US 11,940,774 B2
(45) Date of Patent: Mar. 26, 2024

(54) ACTION IMITATION METHOD AND ROBOT AND COMPUTER READABLE STORAGE MEDIUM USING THE SAME

(71) Applicant: UBTECH ROBOTICS CORP LTD, Shenzhen (CN)

(72) Inventors: Miaochen Guo, Shenzhen (CN); Jingtao Zhang, Shenzhen (CN); Dong Wang, Shenzhen (CN); Shuping Hu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 706 days.

(21) Appl. No.: 17/115,735

(22) Filed: Dec. 8, 2020

(65) Prior Publication Data
US 2021/0200190 A1   Jul. 1, 2021

(30) Foreign Application Priority Data

Dec. 30, 2019   (CN) .......................... 201911397998.2

(51) Int. Cl.
*G05B 19/408* (2006.01)
*G05B 19/4155* (2006.01)
(Continued)

(52) U.S. Cl.
CPC ..... *G05B 19/4086* (2013.01); *G05B 19/4155* (2013.01); *G06F 18/214* (2023.01);
(Continued)

(58) Field of Classification Search
None
See application file for complete search history.

(56) References Cited

U.S. PATENT DOCUMENTS

| 2017/0161590 A1* | 6/2017 | Boulkenafed | ..... G06F 18/24143 |
| 2019/0251340 A1* | 8/2019 | Brown | ................... G06V 40/28 |

(Continued)

FOREIGN PATENT DOCUMENTS

| CN | 108829232 A | 11/2018 |
| CN | 109176512 A | 1/2019 |

(Continued)

*Primary Examiner* — Peter D Nolan
*Assistant Examiner* — Michael F Whalen (57) ABSTRACT

The present disclosure provides action imitation method as well as a robot and a computer readable storage medium using the same. The method includes: collecting at least a two-dimensional image of a to-be-imitated object; obtaining two-dimensional coordinates of each key point of the to-be-imitated object in the two-dimensional image and a pairing relationship between the key points of the to-be-imitated object; converting the two-dimensional coordinates of the key points of the to-be-imitated object in the two-dimensional image into space three-dimensional coordinates corresponding to the key points of the to-be-imitated object through a pre-trained first neural network model, and generating an action control instruction of a robot based on the space three-dimensional coordinates corresponding to the key points of the to-be-imitated object and the pairing relationship between the key points, where the action control instruction is for controlling the robot to imitate an action of the to-be-imitated object.

20 Claims, 7 Drawing Sheets

(51) Int. Cl.
*G06F 18/214* (2023.01)
*G06F 18/22* (2023.01)
*G06N 3/08* (2023.01)
*G06V 10/764* (2022.01)
*G06V 20/10* (2022.01)
*G06V 20/64* (2022.01)
*G06V 40/20* (2022.01)

(52) U.S. Cl.
CPC .............. *G06F 18/22* (2023.01); *G06N 3/08* (2013.01); *G06V 10/764* (2022.01); *G06V 20/10* (2022.01); *G06V 20/647* (2022.01); *G06V 40/20* (2022.01); *G05B 2219/33027* (2013.01); *G05B 2219/50391* (2013.01)

(56) References Cited

U.S. PATENT DOCUMENTS

| | | | |
|---|---|---|---|
| 2021/0205986 A1* | 7/2021 | Kalouche | B25J 9/163 |
| 2022/0044056 A1* | 2/2022 | Liu | G06N 3/045 |

FOREIGN PATENT DOCUMENTS

| | | | | |
|---|---|---|---|---|
| EP | 3731185 A1 * | 10/2020 | | G06K 9/00208 |
| WO | WO-2020254448 A1 * | 12/2020 | | G06T 17/00 |

* cited by examiner

ACTION IMITATION METHOD AND ROBOT AND COMPUTER READABLE STORAGE MEDIUM USING THE SAME

CROSS REFERENCE TO RELATED APPLICATIONS

The present disclosure claims priority to Chinese Patent Application No. 201911397998.2, filed Dec. 30, 2019, which is hereby incorporated by reference herein as if set forth in its entirety.

BACKGROUND

1. Technical Field

The present disclosure relates to robot technology, and particularly to an action imitation method as well as a robot and a computer readable storage medium using the same.

2. Description of Related Art

When imitating human actions, the existing humanoid robot mainly relies on multiple cameras disposed in a specific scene and requires a to-be-imitated object such as a human or an animal to put on a device with light-sensitive elements. In which, the light-sensitive elements are placed on some essential portions of, for example, a human body, and the images of the light-sensitive elements are captured by the cameras from different view angles so as to accurately locate each joint of the human body by performing multi-view fusions, thereby obtaining the actions of the human body and performing corresponding action imitations.

However, the above-mentioned existing action imitation method not only requires the to-be-imitated object to put on a device with light-sensitive elements, but is also easily restricted by the working environment hence may not work normally in outdoor environments.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "said", "a," "an," and "the" are intended to include the plural forms as well, unless the context clearly indicates otherwise.

As mentioned above, when imitating human actions, the existing humanoid robot mainly relies on multiple cameras disposed in a specific scene and requires a to-be-imitated object such as a human to put on a device with light-sensitive elements. In which, the light-sensitive elements are placed on some essential portions of the human body, and the images of the light-sensitive elements are captured by the cameras from different view angles so as to accurately locate each joint of the human body by performing multi-view fusions, thereby obtaining the actions of the human body and performing corresponding action imitations.

However, the above-mentioned existing action imitation method not only requires the to-be-imitated object to put on a device with light-sensitive elements, but is also easily restricted by the working environment hence may not work normally in outdoor environments.

For the above-mentioned reasons, the embodiments of the present disclosure provide an action imitation method as well as a robot and a computer readable storage medium using the same, which can make a robot to perform action imitation tasks without being restricted by the working environment. In addition, the to-be-imitated object does not need to put on a device with light-sensitive elements.

It should be noted that, in the action imitation method as well as the robot and the computer readable storage medium using the same, it obtains actions performed by a to-be-imitated object such as a human body or an animal through two-dimensional images taken by image collecting devices such as monocular cameras from different view angles. As an example, it can predict three-dimensional coordinates through two-dimensional coordinates of each key point of the to-be-imitated object in the two-dimensional images taken by the monocular cameras so as to obtain the actions of the to-be-imitated object, which is different from the traditional method of obtaining the actions of the to-be-imitated object through the two-dimensional images taken by the monocular cameras. In the traditional method, it detects two-dimensional key points through two-dimensional images, and the direction of the action of the human body is supposed, and then calculates the angle of joint through the length of limb, which cannot distinguish the front and back of the action, that is, any depth information cannot not be obtained. Therefore, the traditional method has certain limitations. In the contrary, in the present disclosure, since the three-dimensional coordinates are predicted through the two-dimensional coordinates of each key point of the to-be-imitated object in the two-dimensional image taken by the monocular cameras, it can obtain complete and more accurate three-dimensional coordinates of each key point of the to-be-imitated object, and can improve the precision of the action imitation of the robot.

In the embodiments, at least a two-dimensional image of a to-be-imitated object is collected, and two-dimensional coordinates of each key point of the to-be-imitated object in the two-dimensional image and a pairing relationship between the key points of the to-be-imitated object are obtained, then the two-dimensional coordinates of the key points of the to-be-imitated object in the two-dimensional image are converted into space three-dimensional coordinates corresponding to the key points of the to-be-imitated object through a pre-trained first neural network model, and an action control instruction of a robot is generated based on the space three-dimensional coordinates corresponding to the key points of the to-be-imitated object and the pairing relationship between the key points, where the action control instruction is for controlling the robot to imitate an action of the to-be-imitated object. In this manner, the robot can imitate the action of the to-be-imitated object according to the action control instruction, and the robot can perform action imitation tasks without being restricted by the working environment. In addition, the to-be-imitated object does not need to put on a device with light-sensitive elements.

For the purpose of describing the technical solutions of the present disclosure, the following describes through specific embodiments.

Figure 1:
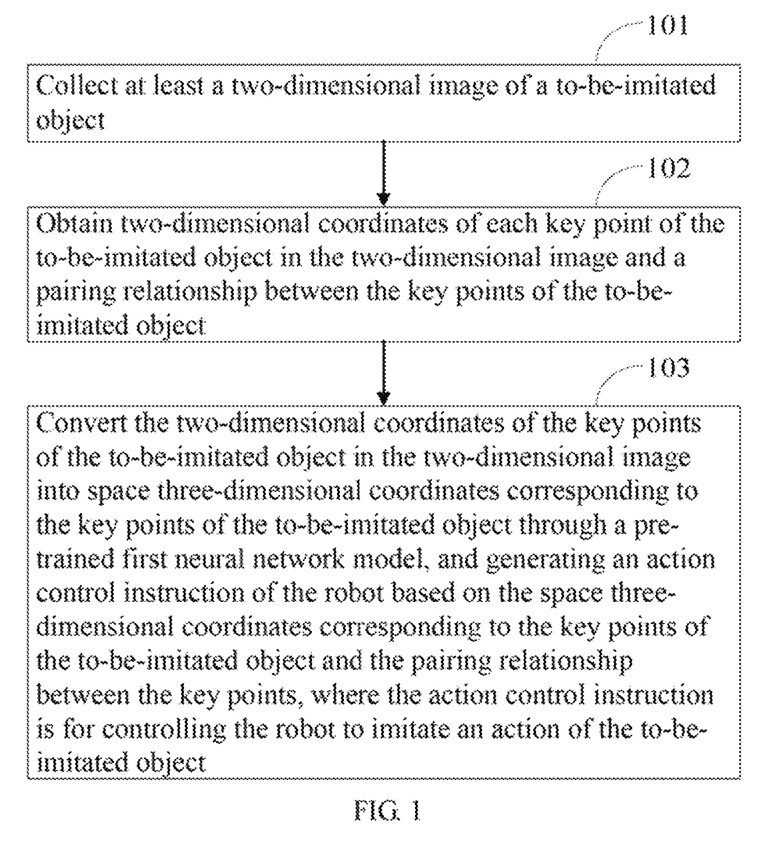
FIG. 1 is a flow chart of an action imitation method according to an embodiment of the present disclosure.

FIG. 1 is a flow chart of an action imitation method according to an embodiment of the present disclosure. In this embodiment, an action imitation method for a robot is provided. The robot can be, for example, a humanoid robot or a robot dog. The method is a computer-implemented method executable for a processor. In one embodiment, the method may be implemented through and applied to an action imitation apparatus shown in FIG. 6 or a robot shown in FIG. 7. As shown in FIG. 1, the method includes the following steps.

101: collecting at least a two-dimensional image of a to-be-imitated object.

When a robot performs action imitation, it generally needs to imitate a series of actions. Therefore, it is necessary to collect at least a two-dimensional image of a to-be-imitated object in real-time by, for example, collecting the two-dimensional images of the to-be-imitated object in a frequency (e.g., 25 Hz, that is, collecting 25 images per second) adequate to identify an action (e.g., making a fist, waving, and walking) of the to-be-imitated object through the collected images, so as to obtain the actions performed by the to-be-imitated object in real time. In this embodiment, the image is collected through image collecting devices such as monocular cameras.

In which, the above-mentioned two-dimensional image may be a two-dimensional image in RGB format. In other embodiments, above-mentioned two-dimensional image may be a two-dimensional image in other formats such as YUV and CMYK.

102: obtaining two-dimensional coordinates of each key point of the to-be-imitated object in the two-dimensional image and a pairing relationship between the key points of the to-be-imitated object.

In which, the above-mentioned key point is a point in the two-dimensional image that corresponds to each joint of the to-be-imitated object, and the above-mentioned pairing relationship between the adjacent key points of joints of the to-be-imitated object is for representing a relative positional relationship between the adjacent joints.

Figure 2:
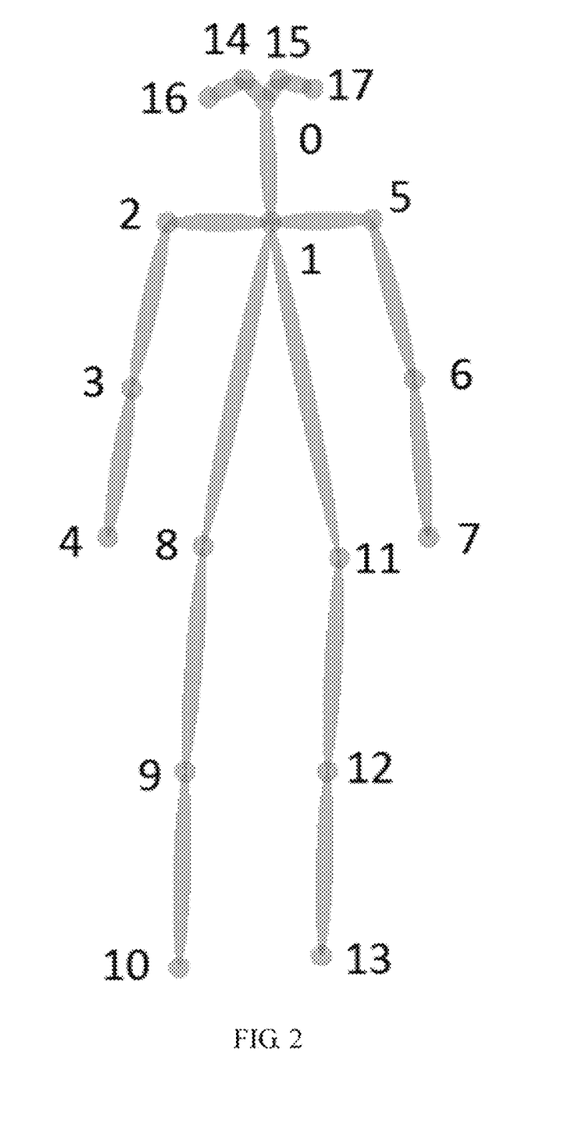
FIG. 2 is a schematic diagram of pairing relationships between key points of a to-be-imitated object according to the embodiment of FIG. 1.

FIG. 2 is a schematic diagram of pairing relationships between key points of a to-be-imitated object according the embodiment of FIG. 1. In this embodiment, as an example, referring to FIG. 2, the 18 key points of the to-be-imitated object and the pairing relationships (as shown by the linkages between the key points) Shown) between the 18 key points. In the 18 key points 0-17 of the to-be-imitated object, the key point 4 on the wrist is matched with the key point 3 on the elbow, and the key point 3 on the elbow is matched with the key point 2 on the shoulder. A total of 17 pairs of pairing relationships each consisting of adjacent two key points can be obtained. In addition, in some embodiments, the pairing relationships of two pairs of key point of the key point 2 on the shoulder and the key point 16 on the head as well as the key point 5 on the shoulder and the key point 17 on the head can be added, so as to obtain the pairing relationships of 19 pairs of key points. In addition, conversely, since the key point 3 on the elbow is matched with the key point 4 on the wrist, and the key point 2 on the shoulder is matched with the key point 3 on the elbow, the pairing relationships of a total of 38 pairs of key points can also be obtained.

In some embodiments, the above-mentioned step 102 of obtaining two-dimensional coordinates of each key point of the to-be-imitated object in the two-dimensional image and the pairing relationship between the key points of the to-be-imitated object may include: inputting the two-dimensional image into a pre-trained second neural network model so that the second neural network model outputs the two-dimensional coordinates of each key point of the to-be-imitated object in the two-dimensional image and the pairing relationship between the key points of the to-be-imitated object.

Figure 3:
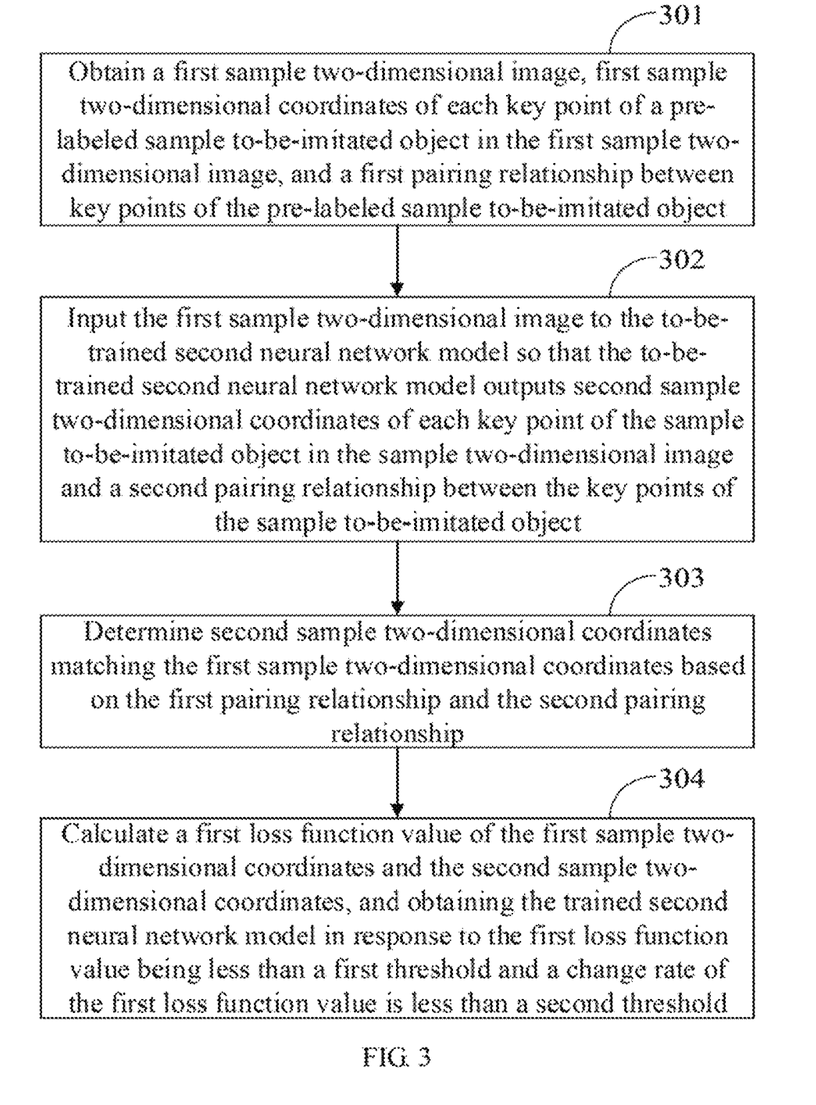
FIG. 3 is a flow chart of training a second neural network model according the embodiment of FIG. 1.

FIG. 3 is a flow chart of training a second neural network model according the embodiment of FIG. 1. As shown in FIG. 3, in some embodiments, the training of the above-mentioned second neural network model may include the following steps.

301: obtaining a first sample two-dimensional image, first sample two-dimensional coordinates of each key point of a pre-labeled sample to-be-imitated object in the first sample two-dimensional image, and a first pairing relationship between key points of the pre-labeled sample to-be-imitated object.

As an example, the labeling of: the first sample two-dimensional coordinates of each key point of the sample to-be-imitated object in the first sample two-dimensional image, and the first pairing relationship between the key points of the sample to-be-imitated object, can be realized using an image key point labeling tool called LabelMe, and the first sample two-dimensional coordinates of each key point of the pre-labeled sample to-be-imitated object in the first sample two-dimensional image and the first pairing relationship between the key points of the sample to-be-imitated object can be stored as a JSON file first for the convenience of using in the second neural network model or the first neural network model.

302: inputting the first sample two-dimensional image to the to-be-trained second neural network model so that the to-be-trained second neural network model outputs second sample two-dimensional coordinates of each key point of the sample to-be-imitated object in the sample two-dimensional image and a second pairing relationship between the key points of the sample to-be-imitated object.

In some embodiments, the above-mentioned step 302 of inputting the first sample two-dimensional image to the to-be-trained second neural network model so that the to-be-trained second neural network model outputs the second sample two-dimensional coordinates of each key point of the sample to-be-imitated object in the sample two-dimensional image and the second pairing relationship between the key points of the sample to-be-imitated object may include: inputting 3 channels of the first sample two-dimensional image to the to-be-trained second neural network model, and outputting 19 channels of the first feature image and 38 channels of the second feature image through the to-be-trained second neural network model.

In which, the above-mentioned 19 channels of the first feature image includes 18 channels each having an feature images containing one key point and one channel of a negative sample image not containing key points. Therefore, by comparing the 18 feature image containing key point and the negative sample image, the second sample two-dimensional coordinates of the 18 key points of the sample to-be-imitated object in the sample two-dimensional image can be obtained. Each of the second feature images of the above-mentioned 38 channels records the pairing relationship between each pair of key points. In such a manner, the 18 key points 0-17 of the sample to-be-imitated object as shown in FIG. 2 and the second pairing relationship between the key points of the sample to-be-imitated object can be obtained.

It should be noted that, the first sample two-dimensional image may contain one or more sample to-be-imitated objects. In the case that the first sample two-dimensional image contains a plurality of sample to-be-imitated objects, the to-be-trained second neural network model will output the second sample two-dimensional coordinates of each key point of the one or more sample to-be-imitated objects in the sample two-dimensional image, and the second pairing relationship between the key points of the sample to-be-imitated object. In addition, the positions and numbers of the key points shown in FIG. 2 are only examples and are not meant to limit the scope of the present disclosure. The specific position and number of key points can be set according to actual application scenarios.

303: determining second sample two-dimensional coordinates matching the first sample two-dimensional coordinates based on the first pairing relationship and the second pairing relationship.

After the above-mentioned first pairing relationship and second pairing relationship are obtained, each set of the first sample two-dimensional coordinates of each key point of the pre-labeled sample to-be-imitated object in the first sample two-dimensional image corresponding to each set of the second sample two-dimensional coordinates of each key point of the sample to-be-imitated object output by the to-be-trained second neural network model in the sample two-dimensional image can be determined.

For example, the second sample two-dimensional coordinates of the key point 1 of the sample to-be-imitated object output by the to-be-trained second neural network model in the sample two-dimensional image correspond to first sample two-dimensional coordinates of the key point 1 of the pre-labeled sample to-be-imitated object in the first sample two-dimensional image.

304: calculating a first loss function value of the first sample two-dimensional coordinates and the second sample two-dimensional coordinates, and obtaining the trained second neural network model in response to the first loss function value being less than a first threshold and a change rate of the first loss function value is less than a second threshold.

In this embodiment, the first loss function value may be a mean squared error (MSE), which is the sum of square of the distance between the predicted value and the real value, that is, the sum of square of the distance between each set of the second sample two-dimensional coordinates of each key point of the sample to-be-imitated object in the sample two-dimensional image that are outputted by the to-be-trained second neural network model and each set of the corresponding first sample two-dimensional coordinates of each key point of the pre-labeled sample to-be-imitated object in the first sample two-dimensional image. Alternatively, the above-mentioned first loss function value may be a mean absolute error (MAE), which is the sum of the absolute value of the difference between the target value and the predicted value.

In this embodiment, in the case that the above-mentioned first loss function value is less than the first threshold and its change rate is less than the second threshold, it means that the parameters in the second neural network model have stabilized, and the training of the second neural network model has completed. By inputting the real-time collected two-dimensional image of the to-be-imitated object into the pre-trained second neural network model, the second neural network model can output the two-dimensional coordinates of the key points of the to-be-imitated object in the two-dimensional image and the pairing relationship between the key points.

In addition, in some embodiments, in the step 102 of obtaining the two-dimensional coordinates of each key point of the to-be-imitated object in the two-dimensional image and the pairing relationship between the key points of the to-be-imitated object, the two-dimensional coordinates can be inputted through a user interface.

103: converting the two-dimensional coordinates of the key points of the to-be-imitated object in the two-dimensional image into space three-dimensional coordinates corresponding to the key points of the to-be-imitated object through a pre-trained first neural network model, and generating an action control instruction of the robot based on the space three-dimensional coordinates corresponding to the key points of the to-be-imitated object and the pairing relationship between the key points, where the action control instruction is for controlling the robot to imitate an action of the to-be-imitated object.

In which, the space three-dimensional coordinates corresponding to the key points of the to-be-imitated object are the three-dimensional coordinates of the key points of the to-be-imitated object in the world coordinate system.

Figure 4:
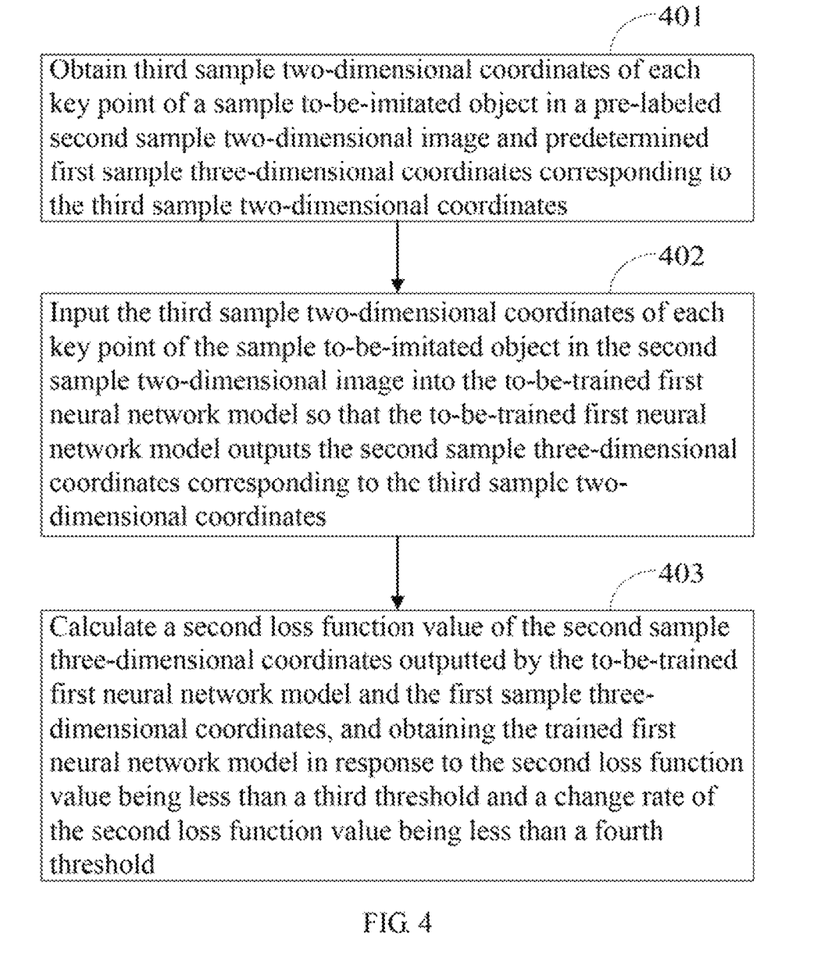
FIG. 4 is a flow chart of training a first neural network model according the embodiment of FIG. 1.

FIG. 4 is a flow chart of training a first neural network model according the embodiment of FIG. 1. As shown in FIG. 4, in some embodiments, the training of the above-mentioned first neural network model may include the following steps.

401: obtaining third sample two-dimensional coordinates of each key point of a sample to-be-imitated object in a pre-labeled second sample two-dimensional image and pre-determined first sample three-dimensional coordinates corresponding to the third sample two-dimensional coordinates.

In which, the third sample two-dimensional coordinates of each key point of the sample to-be-imitated object in the second sample two-dimensional image may be the two-dimensional coordinates of each key point of the sample to-be-imitated object in an image coordinate system of the two-dimensional image, and the first sample three-dimensional coordinates corresponding to the third sample two-dimensional coordinates may be three-dimensional coordinates in the camera coordinate system that correspond to the two-dimensional coordinates in the image coordinate system of the two-dimensional image.

In this embodiment, since the cameras will obtain different images in the case that the cameras shoot the to-be-imitated object of the same posture at different poses, during using the pre-trained first neural network model to convert the two-dimensional coordinates of the key points of the to-be-imitated object in the two-dimensional image into the corresponding three-dimensional coordinates to the key points of the to-be-imitated object, it is impossible to estimate the space three-dimensional coordinates corresponding to the two-dimensional coordinates in the two-dimensional image in the world coordinate system. Therefore, it is necessary to estimate the space three-dimensional coordinates corresponding to the two-dimensional coordinates in the two-dimensional image in the camera coordinate system. That is, the first sample three-dimensional coordinates corresponding to the third sample two-dimensional coordinates are three-dimensional coordinates in the camera coordinate system that correspond to the two-dimensional coordinates in the image coordinate system of the two-dimensional image.

The obtaining of the above-mentioned second sample two-dimensional image and the third sample two-dimensional coordinates of each key point of the sample to-be-imitated object in the second sample two-dimensional image and the first sample three-dimensional coordinates corresponding to the predetermined third sample two-dimensional coordinates can be realized by adopting a motion capture system called "Motion Capture".

For example, the two-dimensional image of the sample to-be-imitated object can be collected by cameras hanging around, then a multi-view fusion algorithm can be used to obtain the three-dimensional coordinates of each key point of the sample to-be-imitated object in the world coordinate system, and then the first sample three-dimensional coordinates in the camera coordinate system corresponding to the three-dimensional coordinates of each key point of the sample to-be-imitated object in the world coordinate system as well as the third sample two-dimensional coordinates in the image coordinate system of the two-sample two-dimensional image corresponding to the first sample three-dimensional coordinates are determined based on the parameters and pose (i.e., position and posture) of each of the cameras, so that the obtained second sample two-dimensional image is a two-dimensional image collected by the cameras at different poses, which can effectively prevent overfitting of the first neural network model and has better generalization ability.

In this embodiment, the above-mentioned parameters of the camera may include the focal length of the camera.

Figure 5:
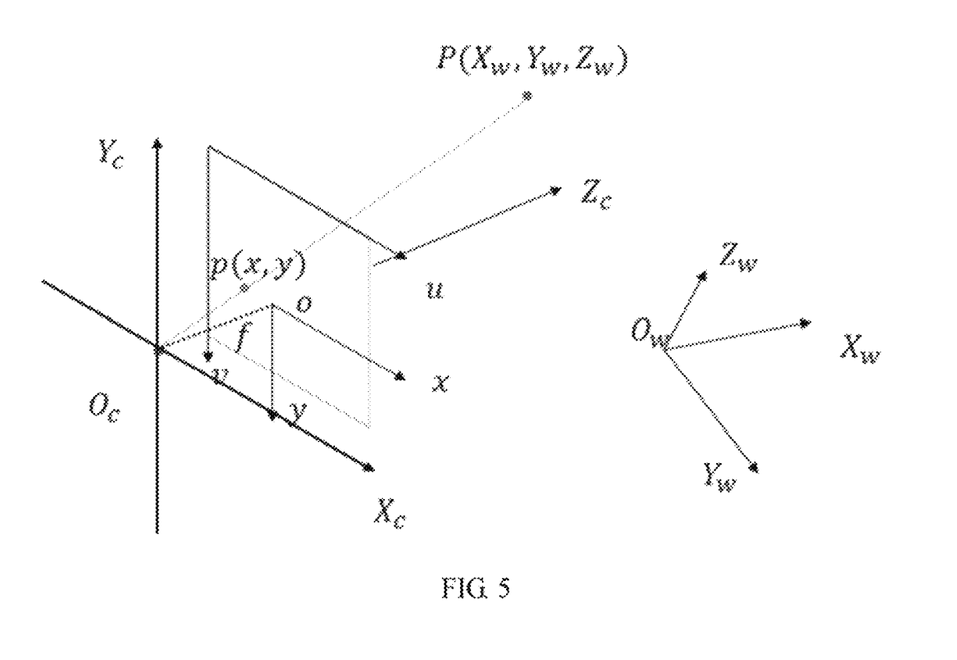
FIG. 5 is a schematic diagram of the coordinate systems according the embodiment of FIG. 1.

FIG. 5 is a schematic diagram of the coordinate systems according the embodiment of FIG. 1. As shown in FIG. 5, the world coordinate system $O_W$-$X_W Y_W Z_W$ in the left part can be used to determine the pose of the camera. The camera coordinate system is a coordinate system $O_c$-$X_c Y_c Z_c$ in the left part that has an optical center $O_c$ as the origin, where o-xy is the image coordinate system, and the optical center $O_c$ is the midpoint of the two-dimensional image. P ($X_W$, $Y_W$, $Z_W$) is a point in the world coordinate system, p is the imaging point in the two-dimensional image, the coordinates in the image coordinate system are (x, y), and uv is a pixel coordinate system with the upper left of the two-dimensional image as the origin, and f is the focal length which is equal to the distance between $O_c$ and o. It can be seen that the transformation of the coordinates in the world coordinate system and the coordinates in the camera coordinate system is a rigid transformation, only shifts and rotations will occur, and the coordinates in the world coordinate system can be mapped to the coordinates in the camera coordinate system through a rotation matrix.

Therefore, the two-dimensional image of the sample to-be-imitated object can be collected by cameras hanging around, then a multi-view fusion algorithm can be used to obtain the three-dimensional coordinates of each key point of the sample to-be-imitated object in the world coordinate system, and then the first sample three-dimensional coordinates in the camera coordinate system corresponding to the three-dimensional coordinates of each key point of the sample to-be-imitated object in the world coordinate system as well as the third sample two-dimensional coordinates in the image coordinate system of the two-sample two-dimensional image corresponding to the first sample three-dimensional coordinates are determined based on the parameters and pose of each of the cameras.

402: inputting the third sample two-dimensional coordinates of each key point of the sample to-be-imitated object in the second sample two-dimensional image into the to-be-trained first neural network model so that the to-be-trained first neural network model outputs the second sample three-dimensional coordinates corresponding to the third sample two-dimensional coordinates.

403: calculating a second loss function value of the second sample three-dimensional coordinates outputted by the to-be-trained first neural network model and the first sample three-dimensional coordinates, and obtaining the trained first neural network model in response to the second loss function value being less than a third threshold and a change rate of the second loss function value being less than a fourth threshold.

In this embodiment, the above-mentioned second loss function value may be a mean squared error, which is the sum of square of the distance between the predicted value and the real value, that is, the sum of square of the distance between the second sample three-dimensional coordinates outputted by the above-mentioned to-be-trained second neural network model and the first sample three-dimensional coordinates corresponding to the predetermined third sample two-dimensional coordinates. Alternatively, the above-mentioned first loss function value may be a mean absolute error, and which is the sum of the absolute value of the difference between the predicted value and the target value, that is, the sum of the absolute value of the difference between the second sample three-dimensional coordinates outputted by the to-be-trained second neural network model and the first sample three-dimensional coordinates corresponding to the predetermined third sample two-dimensional coordinates.

In this embodiment, when the above-mentioned second loss function value is less than the third threshold and its change rate is less than the fourth threshold, it means that the parameters in the first neural network model have stabilized, and the training of the first neural network model has completed. Since the training of the to-be-imitated first neural network model is completed, the pre-trained first neural network model can be used to convert the two-dimensional coordinates of the key points of the to-be-imitated object in the two-dimensional image into the space three-dimensional coordinates corresponding to the key points of the to-be-imitated object.

Correspondingly, during using the pre-trained first neural network model to convert the two-dimensional coordinates of the key points of the to-be-imitated object in the two-dimensional image into the space three-dimensional coordinates corresponding to the key points of the to-be-imitated object, it is necessary to input the two-dimensional coordinates of the key points of the to-be-imitated object in the two-dimensional image into the pre-trained first neural network model so that the pre-trained first neural network model outputs the three-dimensional coordinates corresponding to the key points of the to-be-imitated object in a camera coordinate system; and then convert the three-dimensional coordinates corresponding to the key points of the to-be-imitated object in the camera coordinate system into three-dimensional coordinates in a world coordinate system based on a conversion matrix between coordinates in the camera coordinate system and coordinates in the world coordinate system.

In this embodiment, the two-dimensional coordinates of each key point of the to-be-imitated object in the two-dimensional image and the pairing relationship between the key points of the to-be-imitated object are obtained through the pre-trained second neural network model, and then the pre-trained first neural network model is used to predict the two-dimensional coordinates of the key points of the to-be-imitated object in the two-dimensional image to obtain the space three-dimensional coordinates corresponding to the two-dimensional coordinates of the key points of the to-be-imitated object in the two-dimensional image, which realizes staged calculations, the mechanism can be more flexible, and greatly reduces the calculation amount of coordinate conversion since the pre-trained first neural network model belongs to the non-end-to-end lightweight neural network model.

It should be noted that, in the foregoing method embodiments, for the sake of simple description, the methods are all expressed as a series of steps. But those skilled in the art should know that, the steps are not limited by the described sequences, and some steps can be executed in other order.

In addition, the above-mentioned values of the first threshold, the second threshold, the third threshold, and the fourth threshold can be set according to actual application scenarios.

Figure 6:
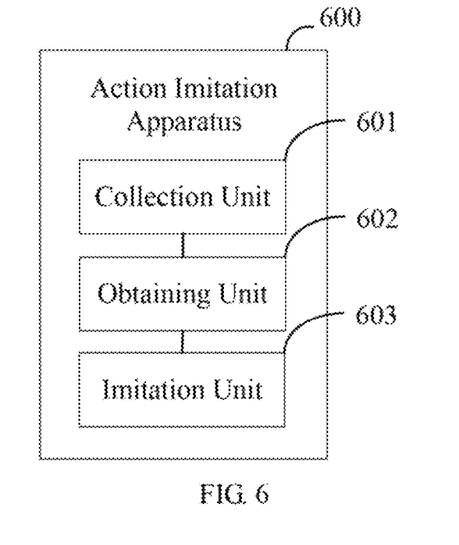
FIG. 6 is a schematic block diagram of an embodiment of an action imitation apparatus according to the present disclosure.

FIG. 6 is a schematic block diagram of an embodiment of an action imitation apparatus according to the present disclosure. In this embodiment, an action imitation apparatus 600 for a robot is provided. The action imitation apparatus 600 can be a component of the robot or the robot itself. The action imitation apparatus 600 may include a collection unit 601, an obtaining unit 602, and an imitation unit 603.

The collection unit 601 is configured to collect at least a two-dimensional image of a to-be-imitated object;
  the obtaining unit 602 is configured to obtain two-dimensional coordinates of each key point of the to-be-imitated object in the two-dimensional image and a pairing relationship between the key points of the to-be-imitated object;
  the imitation unit 603 is configured to convert the two-dimensional coordinates of the key points of the to-be-imitated object in the two-dimensional image into space three-dimensional coordinates corresponding to the key points of the to-be-imitated object through a pre-trained first neural network model, and generate an action control instruction of the robot based on the space three-dimensional coordinates corresponding to the key points of the to-be-imitated object and the pairing relationship between the key points, where the action control instruction is for controlling the robot to imitate an action of the to-be-imitated object.

In one embodiment, the obtaining unit 602 is configured to input the two-dimensional image into a pre-trained second neural network model so that the second neural network model outputs the two-dimensional coordinates of each key point of the to-be-imitated object in the two-dimensional image and the pairing relationship between the key points of the to-be-imitated object.

In one embodiment, the action imitation apparatus 600 further includes a model construction unit configured to:
  obtain a first sample two-dimensional image, first sample two-dimensional coordinates of each key point of a pre-labeled sample to-be-imitated object in the first sample two-dimensional image, and a first pairing relationship between key points of the ore-labeled sample to-be-imitated object;
  input the first sample two-dimensional image to the to-be-trained second neural network model so that the to-be-trained second neural network model outputs second sample two-dimensional coordinates of each key point of the sample to-be-imitated object in the sample two-dimensional image and a second pairing relationship between the key points of the sample to-be-imitated object;
  determine second sample two-dimensional coordinates matching the first sample two-dimensional coordinates based on the first pairing relationship and the second pairing relationship; and
  calculate a first loss function value of the first sample two-dimensional coordinates and the second sample two-dimensional coordinates, and obtaining the trained second neural network model in response to the first loss function value being less than a first threshold and a change rate of the first loss function value is less than a second threshold.

In one embodiment, the model construction unit is further configured to:
  obtain third sample two-dimensional coordinates of each key point of a sample to-be-imitated object in a pre-labeled second sample two-dimensional image and predetermined first sample three-dimensional coordinates corresponding to the third sample two-dimensional coordinates;
  input the third sample two-dimensional coordinates of each key point of the sample to-be-imitated object in the second sample two-dimensional image into the to-be-trained first neural network model so that the to-be-trained first neural network model outputs the second sample three-dimensional coordinates corresponding to the third sample two-dimensional coordinates; and
  calculate a second loss function value of the second sample three-dimensional coordinates outputted by the to-be-trained first neural network model and the first sample three-dimensional coordinates, and obtaining the trained first neural network model in response to the second loss function value being less than a third threshold and a change rate of the second loss function value being less than a fourth threshold.

In one embodiment, the imitation unit 603 is further configured to:

input the two-dimensional coordinates of the key points of the to-be-imitated object in the two-dimensional image into the pre-trained first neural network model so that the pre-trained first neural network model outputs the three-dimensional coordinates corresponding to the key points of the to-be-imitated object in a camera coordinate system; and convert the three-dimensional coordinates corresponding to the key points of the to-be-imitated object in the camera coordinate system into three-dimensional coordinates in a world coordinate system based on a conversion matrix between coordinates in the camera coordinate system and coordinates in the world coordinate system.

It should be noted that, for the convenience and brevity of the description, the detailed working process of the above-mentioned action imitation apparatus 600 can refer to the corresponding steps of the method described in FIG. 1-FIG. 5, which will not be repeated herein.

Figure 7:
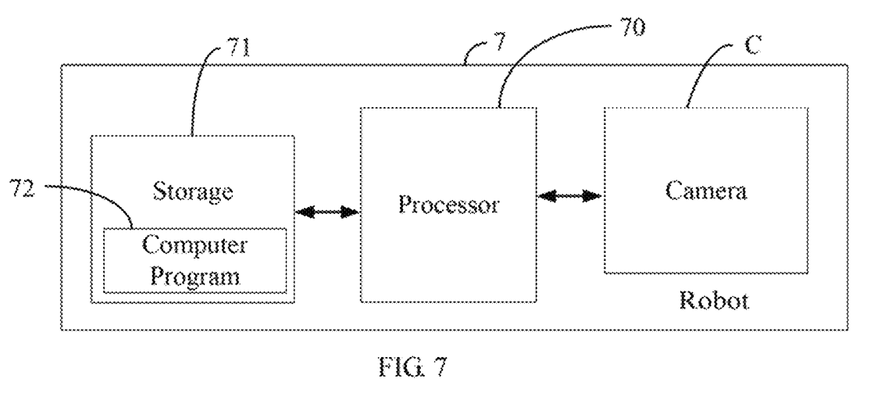
FIG. 7 is a schematic block diagram of an embodiment of a robot according to the present disclosure.

FIG. 7 is a schematic block diagram of an embodiment of a robot according to the present disclosure. In this embodiment, as shown in FIG. 7, the robot 7 can be the above-mentioned robot, which includes a processor 70, a storage 71, a computer program 72 stored in the storage 71 and executable on the processor 70 such as action imitation program, and cameras C (e.g., monocular cameras with different poses that have different view angles with respect to a to-be-imitated object). When executing (instructions in) the computer program 72, the processor 70 implements the steps in the above-mentioned embodiments of the action imitation method, for example, steps 101-103 shown in FIG. 1. Alternatively, when the processor 70 executes (instructions in) the computer program 72, the functions of each module/unit in the above-mentioned device embodiments, for example, the functions of the units 601-603 shown in FIG. 6 are implemented.

The computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7. For example, the computer program 72 can be divided into a collection unit, an obtaining unit, and an imitation unit, where the collection unit is configured to collect at least a two-dimensional image of a to-be-imitated object; the obtaining unit is configured to obtain two-dimensional coordinates of each key point of the to-be-imitated object in the two-dimensional image and a pairing relationship between the key points of the to-be-imitated object; the imitation unit is configured to convert the two-dimensional coordinates of the key points of the to-be-imitated object in the two-dimensional image into space three-dimensional coordinates corresponding to the key points of the to-be-imitated object through a pre-trained first neural network model, and generate an action control instruction of the robot based on the space three-dimensional coordinates corresponding to the key points of the to-be-imitated object and the pairing relationship between the key points, where the action control instruction is for controlling the robot to imitate an action of the to-be-imitated object.

The robot 7 may be a mobile terminal such as a smart phone, or a computing device such as a desktop computer, a notebook computer, a tablet computer, and a cloud server. The robot 7 may include, but is not limited to, the processor 70 and the storage 71. It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented action imitation method for a robot, comprising steps of:
    collecting at least a two-dimensional image of a to-be-imitated object;
    obtaining two-dimensional coordinates of each key point of the to-be-imitated object in the two-dimensional image and a pairing relationship between key points of the to-be-imitated object, wherein the pairing relationship between the key points of the to-be-imitated object is for representing a relative positional relationship between adjacent joints; and
    converting the two-dimensional coordinates of each key point of the to-be-imitated object in the two-dimensional image into space three-dimensional coordinates corresponding to the key points of the to-be-imitated object through a pre-trained first neural network model, and generating an action control instruction of the robot based on the space three-dimensional coordinates corresponding to the key points of the to-be-imitated object and the pairing relationship between the key points, wherein the action control instruction is for controlling the robot to imitate an action of the to-be-imitated object;
    wherein the step of obtaining the two-dimensional coordinates of each key point of the to-be-imitated object in the two-dimensional image and the pairing relationship between the key points of the to-be-imitated object comprises:
        inputting the two-dimensional image into a pre-trained second neural network model, and obtaining the two-dimensional coordinates of each key point of the to-be-imitated object in the two-dimensional image and the pairing relationship between the key points of the to-be-imitated object outputted by the pre-trained second neural network model.

2. The method of claim 1, wherein the step of converting the two-dimensional coordinates of each key point of the to-be-imitated object in the two-dimensional image into the space three-dimensional coordinates corresponding to the key points of the to-be-imitated object through the pre-trained first neural network model comprises:
    inputting the two-dimensional coordinates of each key point of the to-be-imitated object in the two-dimensional image into the pre-trained first neural network model, and obtaining the three-dimensional coordinates corresponding to the key points of the to-be-imitated object in a camera coordinate system outputted by the pre-trained first neural network model; and
    converting the three-dimensional coordinates corresponding to the key points of the to-be-imitated object in the camera coordinate system into three-dimensional coordinates in a world coordinate system based on a conversion matrix between coordinates in the camera coordinate system and coordinates in the world coordinate system.

3. The method of claim 1, further comprising:
    obtaining a first sample two-dimensional image, first sample two-dimensional coordinates of each key point of a pre-labeled sample to-be-imitated object in the first sample two-dimensional image, and a first pairing relationship between key points of the pre-labeled sample to-be-imitated object, and
    training a to-be-trained second neural network model based on the first sample two-dimensional image, the first sample two-dimensional coordinates and the first pairing relationship, to obtain the pre-trained second neural network model.

4. The method of claim 3, wherein the step of training the to-be-trained second neural network model based on the first sample two-dimensional image, the first sample two-dimensional coordinates and the first pairing relationship comprises:
  inputting the first sample two-dimensional image into the to-be-trained second neural network model, to train the to-be-trained second neural network model;
  obtaining, second sample two-dimensional coordinates of each key point of a sample to-be-imitated object in the sample two-dimensional image, and a second pairing relationship between key points of the sample to-be-imitated object, and wherein the second sample two-dimensional coordinates and the second pairing relationship are outputted by the to-be-trained second neural network model;
  determining second sample two-dimensional coordinates matching the first sample two-dimensional coordinates based on the first pairing relationship and the second pairing relationship; and
  calculating a first loss function value of the first sample two-dimensional coordinates and the second sample two-dimensional coordinates;
  determining whether the first loss function value is less than a first threshold and a change rate of the first loss function value is less than a second threshold; and
  in response to the first loss function value not being less than the first threshold or the change rate of the first loss function value not being less than the second threshold, returning to perform the step of inputting the first sample two-dimensional image into the to-be-trained second neural network model, until when the first loss function value is less than the first threshold and the change rate of the first loss function value is less than the second threshold, stopping the training, and obtaining the pre-trained second neural network model.

5. The method of claim 4, wherein the first sample two-dimensional image comprises one or more sample to-be-imitated objects;
  the step of inputting the first sample two-dimensional image into the to-be-trained second neural network model comprises:
    inputting 3 channels of the first sample two-dimensional image into the to-be-trained second neural network model; and
  the step of obtaining the second sample two-dimensional coordinates of each key point of a sample to-be-imitated object in the sample two-dimensional image, and the second pairing relationship between the key points of the sample to-be-imitated object, comprises:
    obtaining 19 channels of a first feature image and 38 channels of a second feature image outputted by the to-be-trained second neural network model, wherein the 19 channels of the first feature image comprises 18 channels of feature images and one channel of a negative sample image, each of the 18 channels of feature images comprises one key point, the one channel of the negative sample image does not comprise key points, and each feature image of the 38 channels of the second feature image records a pairing relationship between each pair of key points of the sample to-be-imitated object; and
    obtaining the second sample two-dimensional coordinates by comparing the 18 channels of feature images and the one channel of the negative sample image, and obtaining the second pairing relationship based on the 38 channels of the second feature image.

6. The method of claim 4, wherein the first loss function value is a mean squared error or a mean absolute error.

7. The method of claim 1, further comprising:
  obtaining, third sample two-dimensional coordinates of each key point of a sample to-be-imitated object in a pre-labeled second sample two-dimensional image, and predetermined first sample three-dimensional coordinates corresponding to the third sample two-dimensional coordinates; and
  training a to-be-trained first neural network model based on the third sample two-dimensional coordinates and the predetermined first sample three-dimensional coordinates, to obtain the pre-trained first neural network model.

8. The method of claim 7, wherein the step of training the to-be-trained first neural network model based on the third sample two-dimensional coordinates and the predetermined first sample three-dimensional coordinates comprises:
  inputting the third sample two-dimensional coordinates into the to-be-trained first neural network model, to train the to-be-trained first neural network model;
  obtaining second sample three-dimensional coordinates corresponding to the third sample two-dimensional coordinates outputted by the to-be-trained first neural network model;
  calculating a second loss function value of the second sample three-dimensional coordinates and the first sample three-dimensional coordinates;
  determining whether the second loss function value is less than a third threshold and a change rate of the second loss function value is less than a fourth threshold; and
  in response to the second loss function value not being less than the third threshold or the change rate of the second loss function value not being less than the fourth threshold, returning to perform the step of inputting the third sample two-dimensional coordinates into the to-be-trained first neural network model, until when the second loss function value is less than the third threshold and the change rate of the second loss function value is less than the fourth threshold, stopping the training, and obtaining the pre-trained first neural network model.

9. The method of claim 7, wherein the step of obtaining the third sample two-dimensional coordinates of each key point of the sample to-be-imitated object in the pre-labeled second sample two-dimensional image, and the predetermined first sample three-dimensional coordinates corresponding to the third sample two-dimensional coordinates, comprises:
  collecting, by cameras hanging around the sample to-be-imitated object, a two-dimensional image of the sample to-be-imitated object;
  obtaining three-dimensional coordinates of each key point of the sample to-be-imitated object in a world coordinate system using a multi-view fusion algorithm according to the collected two-dimensional image; and
  determining, the first sample three-dimensional coordinates in a camera coordinate system corresponding to the three-dimensional coordinates of each key point of the sample to-be-imitated object in the world coordinate system, and the third sample two-dimensional coordinates in an image coordinate system of the pre-labeled second sample two-dimensional image corresponding to the first sample three-dimensional coordinates, based on parameters and pose of each of the cameras, and wherein the parameters comprise a focal length of each camera.

10. The method of claim 8, wherein the second loss function value is a mean squared error or a mean absolute error.

11. A robot, comprising:
a processor;
a memory coupled to the processor;
at least an image collecting device coupled to the processor; and
one or more computer programs stored in the memory and executable on the processor;
wherein, the one or more computer programs comprise:
instructions for collecting, through the image collecting device, at least a two-dimensional image of a to-be-imitated object;
instructions for obtaining two-dimensional coordinates of each key point of the to-be-imitated object in the two-dimensional image and a pairing relationship between key points of the to-be-imitated object, wherein the pairing relationship between the key points of the to-be-imitated object is for representing a relative positional relationship between adjacent joints; and
instructions for converting the two-dimensional coordinates of each key point of the to-be-imitated object in the two-dimensional image into space three-dimensional coordinates corresponding to the key points of the to-be-imitated object through a pre-trained first neural network model, and generating an action control instruction of the robot based on the space three-dimensional coordinates corresponding to the key points of the to-be-imitated object and the pairing relationship between the key points, wherein the action control instruction is for controlling the robot to imitate an action of the to-be-imitated object;
wherein the instructions for obtaining the two-dimensional coordinates of each key point of the to-be-imitated object in the two-dimensional image and the pairing relationship between the key points of the to-be-imitated object comprise:
instructions for inputting the two-dimensional image into a pre-trained second neural network model, and obtaining the two-dimensional coordinates of each key point of the to-be-imitated object in the two-dimensional image and the pairing relationship between the key points of the to-be-imitated object outputted by the pre-trained second neural network model.

12. The robot of claim 11, wherein the instructions for converting the two-dimensional coordinates of each key point of the to-be-imitated object in the two-dimensional image into the space three-dimensional coordinates corresponding to the key points of the to-be-imitated object through the pre-trained first neural network model comprise:
instructions for inputting the two-dimensional coordinates of each key point of the to-be-imitated object in the two-dimensional image into the pre-trained first neural network model, and obtaining the three-dimensional coordinates corresponding to the key points of the to-be-imitated object in a camera coordinate system outputted by the pre-trained first neural network model; and
instructions for converting the three-dimensional coordinates corresponding to the key points of the to-be-imitated object in the camera coordinate system into three-dimensional coordinates in a world coordinate system based on a conversion matrix between coordinates in the camera coordinate system and coordinates in the world coordinate system.

13. The robot of claim 11, wherein the one or more computer programs further comprise:
instructions for obtaining a first sample two-dimensional image, first sample two-dimensional coordinates of each key point of a pre-labeled sample to-be-imitated object in the first sample two-dimensional image, and a first pairing relationship between key points of the pre-labeled sample to-be-imitated object, and
instructions for training a to-be-trained second neural network model based on the first sample two-dimensional image, the first sample two-dimensional coordinates and the first pairing relationship, to obtain the pre-trained second neural network model.

14. The robot of claim 13, wherein the instructions for training the to-be-trained second neural network model based on the first sample two-dimensional image, the first sample two-dimensional coordinates and the first pairing relationship comprise:
instructions for inputting the first sample two-dimensional image into the to-be-trained second neural network model, to train the to-be-trained second neural network model;
instructions for obtaining, second sample two-dimensional coordinates of each key point of a sample to-be-imitated object in the sample two-dimensional image, and a second pairing relationship between key points of the sample to-be-imitated object, and wherein the second sample two-dimensional coordinates and the second pairing relationship are outputted by the to-be-trained second neural network model;
instructions for determining second sample two-dimensional coordinates matching the first sample two-dimensional coordinates based on the first pairing relationship and the second pairing relationship; and
instructions for calculating a first loss function value of the first sample two-dimensional coordinates and the second sample two-dimensional coordinates;
instructions for determining whether the first loss function value is less than a first threshold and a change rate of the first loss function value is less than a second threshold; and
instructions for, in response to the first loss function value not being less than the first threshold or the change rate of the first loss function value not being less than the second threshold, returning to perform the step of inputting the first sample two-dimensional image into the to-be-trained second neural network model, until when the first loss function value is less than the first threshold and the change rate of the first loss function value is less than the second threshold, stopping the training, and obtaining the pre-trained second neural network model.

15. The robot of claim 11, wherein the one or more computer programs further comprise:
instructions for obtaining, third sample two-dimensional coordinates of each key point of a sample to-be-imitated object in a pre-labeled second sample two-dimensional image, and predetermined first sample three-dimensional coordinates corresponding to the third sample two-dimensional coordinates; and
instructions for training a to-be-trained first neural network model based on the third sample two-dimensional coordinates and the predetermined first sample three-dimensional coordinates, to obtain the pre-trained first neural network model.

16. The robot of claim 15, wherein the instructions for training the to-be-trained first neural network model based on the third sample two-dimensional coordinates and the predetermined first sample three-dimensional coordinates comprises:
- instructions for inputting the third sample two-dimensional coordinates into the to-be-trained first neural network model, to train the to-be-trained first neural network model;
- instructions for obtaining second sample three-dimensional coordinates corresponding to the third sample two-dimensional coordinates outputted by the to-be-trained first neural network model;
- instructions for calculating a second loss function value of the second sample three-dimensional coordinates and the first sample three-dimensional coordinates;
- instructions for determining whether the second loss function value is less than a third threshold and a change rate of the second loss function value is less than a fourth threshold; and
- instructions for, in response to the second loss function value not being less than the third threshold or the change rate of the second loss function value not being less than the fourth threshold, returning to perform the step of inputting the third sample two-dimensional coordinates into the to-be-trained first neural network model, until when the second loss function value is less than the third threshold and the change rate of the second loss function value is less than the fourth threshold, stopping the training, and obtaining the pre-trained first neural network model.

17. A non-transitory computer readable storage medium for storing one or more computer programs, wherein the one or more computer programs comprise:
- instructions for collecting at least a two-dimensional image of a to-be-imitated object;
- instructions for obtaining two-dimensional coordinates of each key point of the to-be-imitated object in the two-dimensional image and a pairing relationship between key points of the to-be-imitated object, wherein the pairing relationship between the key points of the to-be-imitated object is for representing a relative positional relationship between adjacent joints; and
- instructions for converting the two-dimensional coordinates of each key point of the to-be-imitated object in the two-dimensional image into space three-dimensional coordinates corresponding to the key points of the to-be-imitated object through a pre-trained first neural network model, and generating an action control instruction of a robot based on the space three-dimensional coordinates corresponding to the key points of the to-be-imitated object and the pairing relationship between the key points, wherein the action control instruction is for controlling the robot to imitate an action of the to-be-imitated object;
- wherein the instructions for obtaining the two-dimensional coordinates of each key point of the to-be-imitated object in the two-dimensional image and the pairing relationship between the key points of the to-be-imitated object comprise:
  - instructions for inputting the two-dimensional image into a pre-trained second neural network model, and obtaining the two-dimensional coordinates of each key point of the to-be-imitated object in the two-dimensional image and the pairing relationship between the key points of the to-be-imitated object outputted by the pre-trained second neural network model.

18. The storage medium of claim 17, wherein the instructions for converting the two-dimensional coordinates of each key point of the to-be-imitated object in the two-dimensional image into the space three-dimensional coordinates corresponding to the key points of the to-be-imitated object through the pre-trained first neural network model comprise:
- instructions for inputting the two-dimensional coordinates of each key point of the to-be-imitated object in the two-dimensional image into the pre-trained first neural network model, and obtaining the three-dimensional coordinates corresponding to the key points of the to-be-imitated object in a camera coordinate system outputted by the pre-trained first neural network model; and
- instructions for converting the three-dimensional coordinates corresponding to the key points of the to-be-imitated object in the camera coordinate system into three-dimensional coordinates in a world coordinate system based on a conversion matrix between coordinates in the camera coordinate system and coordinates in the world coordinate system.

19. The storage medium of claim 17, wherein the one or more computer programs further comprise:
- instructions for obtaining a first sample two-dimensional image, first sample two-dimensional coordinates of each key point of a pre-labeled sample to-be-imitated object in the first sample two-dimensional image, and a first pairing relationship between key points of the pre-labeled sample to-be-imitated object, and
- instructions for training a to-be-trained second neural network model based on the first sample two-dimensional image, the first sample two-dimensional coordinates and the first pairing relationship, to obtain the pre-trained second neural network model.

20. The storage medium of claim 17, wherein the one or more computer programs further comprise:
- instructions for obtaining, third sample two-dimensional coordinates of each key point of a sample to-be-imitated object in a pre-labeled second sample two-dimensional image, and predetermined first sample three-dimensional coordinates corresponding to the third sample two-dimensional coordinates; and
- instructions for training a to-be-trained first neural network model based on the third sample two-dimensional coordinates and the predetermined first sample three-dimensional coordinates, to obtain the pre-trained first neural network model.

* * * * *